May 26, 1964 F. R. MEYER 3,134,320
PORTABLE OUTDOOR BARBECUE GRILL
Filed March 10, 1958

INVENTOR.
FRED R. MEYER

United States Patent Office 3,134,320
Patented May 26, 1964

3,134,320
PORTABLE OUTDOOR BARBECUE GRILL
Fred R. Meyer, 1943 California St., San Francisco, Calif., assignor of one-fourth to Kenneth E. Battaglia, San Rafael, Calif., one-fourth to P. T. Kavanaugh, San Francisco, Calif., and one-fourth to Rocking G. Farms, Inc., a corporation of California
Filed Mar. 10, 1958, Ser. No. 720,104
1 Claim. (Cl. 99—340)

The invention relates to portable outdoor barbecue devices customarily including a metal bowl for burning coals and portable legs or stand therefor, a motor and spit for turning food over the coals and an alternative stationary horizontal grill for cooking food over the coals.

An object of the present invention is to provide an apparatus of the character described in which the customary horizontal grill is given a rotary motion in its horizontal plane so that food on the grill is carried successively over the varying heat zones occasioned by the usual uneven burning of the fuel, whereby food at various positions on the grill will be more uniformly heated and cooked. As another feature of this rotary motion of the grill provided by the present invention, the combustible fat drippings which ordinarily drop onto and feed fuel to the hottest spots in the bowl thus accentuating the uneven heat conditions, are more uniformly distributed throughout the burning area and tend to bring all parts of the burning area to a more constant heat.

Another object of the present invention is to carry out the improvements above noted in a conventional barbecue apparatus with minimum change, alterations and additions, and wherein the conventional spit motor is used alternatively to drive the grill.

A further object of the present invention is to provide an apparatus of the character above which is composed of a minimum number of simply and sturdily composed parts capable of providing long and trouble free operation.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and description may be adopted within the scope of the invention as set forth in the claim.

Referring to said drawings.

Figures 1, 2:
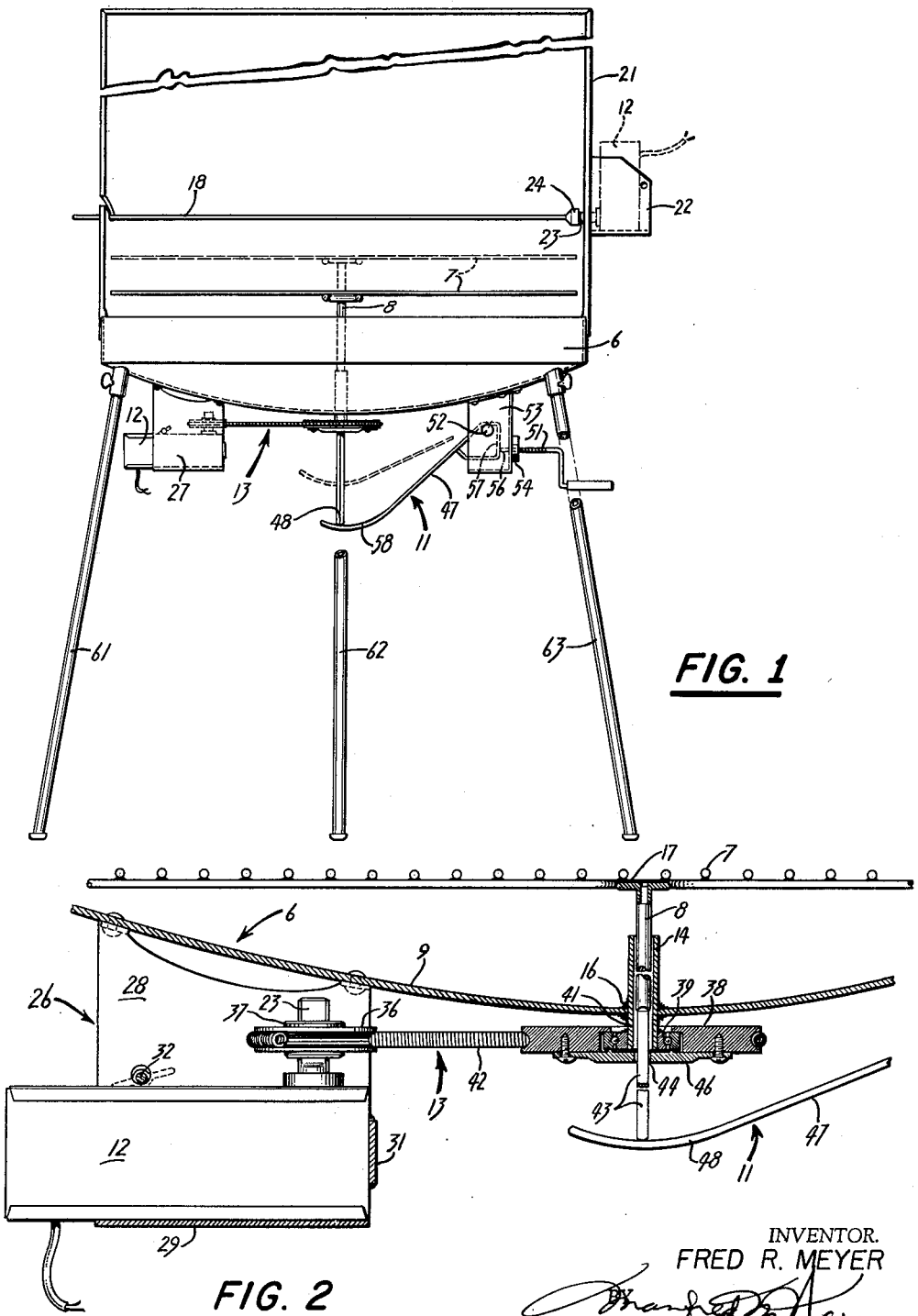
FIGURE 1 is a side elevation barbecue apparatus constructed in accordance with the present invention.
FIGURE 2 is a fragmentary cross-sectional view on an enlarged scale showing certain portions of the grill.

The portable outdoor barbecue grill of the present invention consists briefly of a metal bowl 6 for burning coals, a food supporting grill 7, and a shaft 8 secured to the grill and mounted for rotation on the bowl for supporting the grill 7 for rotation in superimposed relation over the bottom 9 of the bowl, means 11 engaging the shaft 8 for raising and lowering the grill, an electric motor 12, and drive means 13 connecting the motor and shaft for rotation of the grill. As will be best observed from FIGURE 2, the metal bowl 6 is provided with a centrally arranged vertically set tubular bearing member 14, which is mounted through the bottom 9 of the bowl and secured thereto, as by welding 16, and which functions to journal the shaft 8 for rotation on the vertical central axis of the bowl. Preferably the grill 7 is of flat circular open wire form so as to provide a planar food supporting section, and shaft 8 is fixed to the grill section by a collar piece 17 welded or braised to the under side of the grill, so that the shaft projects centrally and perpendicularly from the grill, thereby supporting the latter for rotation in a substantially horizontal plane, as illustrated.

The barbecue apparatus as illustrated in FIGURE 1 is provided with a conventional spit 18 and electric spit motor which are appropriately supported in a hood section 21 demountably positioned on the top rim of bowl 6. As will be observed, the motor is carried in a motor mounting frame 22 secured to the outer side of the hood 21 and the motor is provided with a square drive shaft 23 fitting into a square socket end 24 of the spit 18. As a feature of the present invention the conventional spit motor is used alternately as motor 12 hereinabove designated for driving the grill. This alternate use of the motor is quite feasible since in the normal use of the barbecue grill either the spit 18 or grill 7 but normally not both are used at one time. To carry out this alternative use of electric motor 12 there is provided at the under side of the bowl 6 and spaced near an outer edge thereof, a motor mount 26 which is adapted to demountably receive and support the spit motor 12. As here shown this mount is composed of a sheet metal box-like enclosure having opposed sides 27 and 28 and interned bottom portions 29 for receiving and supporting the box-like motor housing. A forward side 31 and a superimposed removable bolt 32 completes the demountable support for the motor when the latter is inserted in the support as illustrated in FIGURE 2 with the motor shaft 23 uppermost and erect in spaced parallel relation to grill shaft 8.

The drive 13 here includes a pulley wheel 36 having a central hub 37 with a square opening adapted to slip over motor shaft 23 and which is thus arranged to rotate in a horizontal plane. A second pulley wheel 38 is here journalled for rotation by bearing 39 on the lower end 41 of the tubular member 14 depending from the under side of the bowl bottom 9. A metal coil spring type belt 42 is entrained around the pulley wheels 36 and 38. Pulley wheel 38 is provided with a splined drive connection to shaft 8 permitting relative axial displacement between the shaft and drive member 38 for raising and lowering of the grill. This spline connection is here effected by forming the lower end portion 43 of shaft 8 of square or other non-circular form and engaging the periphery of the end portion 43 in a square or similar non-circular opening 44 provided in the drive member 38. As here shown the splined opening 44 is provided by a separate plate 46 secured to the under side of the pulley wheel 38.

Raising and lowering of the grill is here effected by an arm 47 pivoted at the under side of the bowl and extending into underlying relation to and supporting the lower end 48 of the shaft, and crank means 51 engaging the arm for raising and lowering the shaft with respect to the bowl. As here shown the arm 47 is mounted on a cross-pin or bolt 52 in a sheet metal housing 53 secured to the under side of the bowl and crank 51 is threaded through a nut 54 on the housing to advance the inner end 56 of the crank against an offset end portion 57 of the arm. Accordingly advancing or retracting the end portion 56 through nut 54 will cause a swinging up or down of the opposite outer free end 58 of the arm underlying shaft end 48.

The bowl 6 may be supported on the usual circumferentially spaced legs 61, 62, and 63.

Preferably the rotary motion imparted to the grill 7 is quite slow, it being recommended that the drive be set to rotate the grill at a speed in the order of about three turns per minute.

I claim:

A portable outdoor barbecue grill comprising, a metal bowl and legs for supporting said bowl in elevated position for receipt of burning coals, a spit motor mount positioned above and to one side of said bowl for use in cooperation with a spit for turning food to be barbecued over said coals, a tubular bearing member mounted centrally through the bottom of said bowl and having a lower end depending therefrom, a food supporting grill having a centrally arranged depending shaft journalled for rotation in and extending through said bearing member, means engaging the lower end of said shaft for raising and lowering said grill with respect to said bowl, a pulley mounted for rotation of said lower end of said bearing member and having a splined connection to said shaft for permitting relative axial displacement of said shaft through said pulley upon raising and lowering of said grill, a grill turning motor mount positioned under said bowl and to one side of said bearing member, an electric motor formed for optional positioning in said motor mounts and having a shaft adapted for optionally driving said spit and grill, a pulley mounted on said motor shaft, and a belt entrained around said pulleys for driving said grill shaft by said motor.

References Cited in the file of this patent
UNITED STATES PATENTS

| | | |
|---|---|---|
| 381,470 | Harmon | Apr. 17, 1888 |
| 569,397 | Armstrong | Oct. 13, 1896 |
| 653,619 | Devin | May 10, 1900 |
| 796,765 | Smith | Aug. 8, 1905 |
| 1,771,885 | Faulds | July 29, 1930 |
| 1,895,230 | Needham | Jan. 24, 1933 |
| 2,057,421 | Dickson | Oct. 13, 1936 |
| 2,819,667 | Victor | Jan. 14, 1958 |
| 2,845,856 | Sack | Aug. 5, 1958 |